United States Patent
Kunze et al.

(10) Patent No.: US 11,817,064 B2
(45) Date of Patent: Nov. 14, 2023

(54) CONTROL OF A DISPLAY ON AN AUGMENTED REALITY HEAD-UP DISPLAY DEVICE FOR A VEHICLE

(71) Applicant: Volkswagen Aktiengesellschaft, Wolfsburg (DE)

(72) Inventors: Alexander Kunze, Braunschweig (DE); Yannis Tebaibi, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/344,840

(22) Filed: Jun. 10, 2021

(65) Prior Publication Data
US 2021/0390926 A1    Dec. 16, 2021

(30) Foreign Application Priority Data
Jun. 11, 2020 (DE) .......................... 102020207314.7

(51) Int. Cl.
*G09G 5/10* (2006.01)
*B60K 35/00* (2006.01)
(Continued)

(52) U.S. Cl.
CPC ............... *G09G 5/10* (2013.01); *B60K 35/00* (2013.01); *G02B 27/0101* (2013.01); *G09G 5/30* (2013.01); *B60K 2370/1529* (2019.05); *B60K 2370/166* (2019.05); *B60K 2370/178* (2019.05); *B60K 2370/48* (2019.05); *B60K 2370/52* (2019.05);
(Continued)

(58) Field of Classification Search
None
See application file for complete search history.

(56) References Cited

U.S. PATENT DOCUMENTS

| | | | |
|---|---|---|---|
| 7,743,342 B2 * | 6/2010 | Nishijima | G06F 3/04817 715/810 |
| 2008/0224837 A1 * | 9/2008 | Meyer | B60Q 9/005 340/435 |

(Continued)

FOREIGN PATENT DOCUMENTS

| | | |
|---|---|---|
| DE | 102008002560 A1 | 12/2009 |
| DE | 102009003220 A1 | 11/2010 |

(Continued)

OTHER PUBLICATIONS

Abbard et al. "Behind the Glass: Driver Challenges and Opportunities for AR Automotive Applications." roceedings of the IEEE, vol. 102, No. 2, pp. 124-136 (Feb. 2014).

(Continued)

*Primary Examiner* — Jason A Pringle-Parker
(74) *Attorney, Agent, or Firm* — Peter Zura; LOZA & LOZA, LLP

(57) ABSTRACT

Controlling a display in an augmented reality head-up display for a vehicle. At least one safety-relevant parameter is determined in a first step. If two or more safety-relevant parameters are determined, one of the determined parameters can optionally be selected as a critical parameter. The intensity of the display element displayed on the augmented reality head-up display is subsequently adjusted on the basis of the at least one safety-relevant parameter. The display element is then output for display on the augmented reality head-up display.

17 Claims, 6 Drawing Sheets

(51) Int. Cl.
*G02B 27/01* (2006.01)
*G09G 5/30* (2006.01)

(52) U.S. Cl.
CPC ............................ *G02B 2027/014* (2013.01); *G02B 2027/0118* (2013.01); *G09G 2320/0613* (2013.01); *G09G 2380/10* (2013.01)

(56) References Cited

U.S. PATENT DOCUMENTS

| | | | | |
|---|---|---|---|---|
| 2012/0008048 | A1* | 1/2012 | Sekine | G06T 19/006 348/565 |
| 2016/0049005 | A1* | 2/2016 | Mullins | G06V 10/56 345/420 |
| 2016/0140760 | A1* | 5/2016 | Bowden | B60R 1/00 345/633 |
| 2017/0161009 | A1* | 6/2017 | Ogisu | G02B 27/0101 |
| 2017/0162177 | A1* | 6/2017 | Lebeck | G06F 3/14 |
| 2017/0287217 | A1* | 10/2017 | Kim | H04N 5/2252 |
| 2018/0066956 | A1* | 3/2018 | Kim | G06T 19/006 |
| 2018/0189568 | A1* | 7/2018 | Powderly | G06V 30/194 |
| 2018/0239136 | A1* | 8/2018 | Ishikawa | G06F 3/013 |
| 2018/0330539 | A1* | 11/2018 | Katagiri | G06T 19/006 |
| 2019/0005726 | A1* | 1/2019 | Nakano | G06T 19/006 |
| 2019/0005727 | A1* | 1/2019 | Tanaka | G09G 3/02 |
| 2019/0051056 | A1* | 2/2019 | Chiu | G06K 9/6267 |
| 2019/0299855 | A1* | 10/2019 | Ostapenko | G06T 19/006 |
| 2020/0005430 | A1 | 1/2020 | Takazawa | |
| 2020/0394841 | A1* | 12/2020 | Kaino | G06T 7/50 |

FOREIGN PATENT DOCUMENTS

| | | |
|---|---|---|
| DE | 102012210145 A1 | 12/2012 |
| DE | 102012020568 A1 | 4/2014 |
| DE | 102017220268 A1 | 5/2019 |
| DE | 102017222031 A1 | 6/2019 |
| DE | 1102019202113 A1 | 10/2019 |
| DE | 102019202590 A1 | 8/2020 |

OTHER PUBLICATIONS

Corresponding EP Application No. 2172096.6. Examination Report (dated Mar. 23, 2023).

* cited by examiner

CONTROL OF A DISPLAY ON AN AUGMENTED REALITY HEAD-UP DISPLAY DEVICE FOR A VEHICLE

CROSS REFERENCE TO RELATED APPLICATION

The present application claims priority to German Patent Application no. 10 2020 207 314.7, to Alexander Kunze et al. filed Jun. 11, 2020, the contents which is incorporated by reference in its entirety herein.

TECHNICAL FIELD

The present disclosure relates to a method, a computer program containing instructions, and a device for controlling a display on an augmented reality head-up display for a vehicle. The present disclosure also relates to a vehicle in which methods according to the present disclosure or a device according to the present disclosure are implemented.

BACKGROUND

With the constant development of virtual and augmented reality technologies and applications, they are also being used in motor vehicles and other forms of locomotion. Augmented reality (AR) concerns enrichment of the real world through virtual elements, which are correctly registered in three-dimensional space, enabling real-time interaction therewith. Because the term "augmented reality" is also used in German, it shall be used throughout in the German version of this application. "Mixed reality" is also used synonymously.

One possible technical means for augmenting the driver's workplace with perspective-correct, contact-analog virtual augmentation is the head-up display (HUD). The light beams of a display incorporated in a dashboard are projected via numerous mirrors and lenses and a projection surface into the eye of the driver, such that a virtual image can be seen outside the vehicle. The windshield is usually used in the automotive industry as the projection surface, the curvature of which must be taken into account for the depiction. Alternatively, an additional glass or plastic pane can also be used, placed between the driver and the windshield on the dashboard. By superimposing the display onto what the driver sees, less head and eye movement is required for viewing the information projected therein. Furthermore, the eyes do not have to adapt as much, because they do not have to adjust as much, or at all, for the display, depending on the virtual distance.

Augmented reality can be used in a number of ways to support the driver with contact-analog markings on roadways and objects. Relatively obvious examples relate to the field of navigation. While classic navigation displays in conventional head-up displays normally show schematic depictions, e.g., an arrow pointing at a right angle to the right indicates a right turn at the next opportunity, AR displays offer substantially more effective possibilities. Because the displays can be depicted as "part of the environment," it is possible to present navigation instructions or hazard warnings to the driver directly, at the real locations to which they refer.

The article by J. L. Gabbard et al.; "Behind the Glass: Driver Challenges and Opportunities for AR Automotive Applications" [1] examines challenges in integrating augmented reality in automobile applications. Concealing the environment with driver-relevant information, also referred to as occlusion, is one of the main disadvantages with contact-analog AR displays. Augmented reality head-up displays present information directly within the driver's view. Accordingly, any display in a head-up display could conceal critical information, e.g., an obstruction on the road. This effect is intensified by clutter, i.e., the accumulation of numerous elements in a small space.

In conjunction with the superimposed presentation of image data, DE 10 2012 020 568 A1 describes a method for operating a navigator in a motor vehicle. In the method, an adaptation device in the navigator receives a signal from at least one sensor relating to a physical or chemical property or material quality of the vehicle's environment that can be seen by a driver of the motor vehicle in the environment. A realistic image of the environment is generated on the basis of the signal, in which the property or quality identified by the signal is depicted. The realistic image of the environment is combined with the map of the environment, and a combined graphic generated in this manner is output to the display.

SUMMARY

Aspects of the present disclosure are directed to solutions for controlling a display of an augmented reality head-up display for a vehicle, which reduce the disadvantages resulting in concealing information relevant to the driver.

In some examples, technologies and techniques are disclosed for controlling a display in an augmented reality head-up display for a vehicle that may include determining at least one safety-relevant parameter; and adjusting an intensity of a display element presented in the augmented reality head-up display on the basis of the at least one safety-relevant parameter.

In some examples, a computer program is disclosed including instructions with which a computer can execute steps for controlling a display in an augmented reality head-up display for a vehicle, including determining at least one safety-relevant parameter; and adjusting an intensity of a display element presented in the augmented reality head-up display on the basis of the at least one safety-relevant parameter.

The term "computer" is used broadly in this context. In particular, it also comprises control units, embedded systems and other processor-based data processing systems. The computer program can be retrieved electronically, for example, or stored on a computer-readable storage medium.

In some examples, a device is disclosed for controlling a display on an augmented reality head-up display for a vehicle, where the device may include an analysis module for determining at least one safety-relevant parameter; and a control module for adjusting an intensity of a display element presented in the augmented reality head-up display on the basis of the at least one safety-relevant parameter.

A method according to the present disclosure or a device according to the present disclosure may be used with particular advantage in an autonomous, semi-autonomous, or manually operated vehicle. The vehicle can be a motor vehicle in particular, or a ship, aircraft, e.g., a Volocopter, etc.

BRIEF DESCRIPTION OF THE DRAWINGS

Further features of the present disclosure shall become clear from the following description and the attached claims, in conjunction with the drawings. Therein:

DETAILED DESCRIPTION

Figure 1:
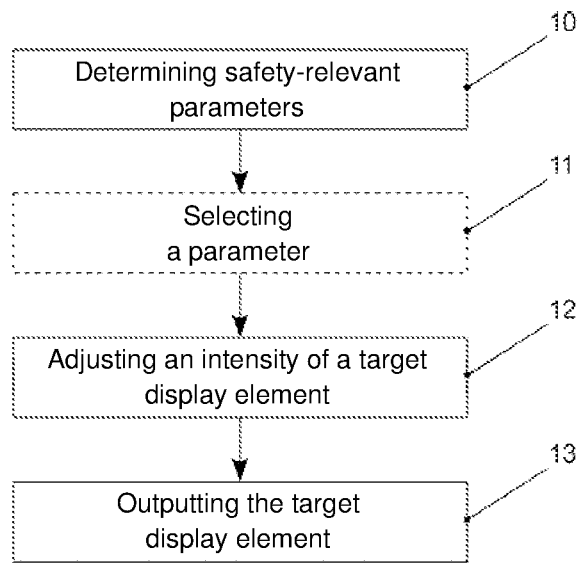
FIG. 1 shows a schematic illustration of a method for controlling a display on an augmented reality head-up display for a vehicle according to some aspects of the present disclosure.

For a better understanding of the principles of the present disclosure, embodiments of the present disclosure shall be explained below in reference to the figures. It should be noted that the present disclosure is not limited to the specifically disclosed embodiments, and that the features described in reference thereto can also be combined or modified without abandoning the scope of protection for the present disclosure, as defined in the attached claims.

In some examples, an occlusion or concealment resulting from display elements may be dynamically reduced according to aspects of the present disclosure. Intensities of the display elements may be reduced on the basis of safety-relevant parameters. The opacity of the display element can be adjusted for this, or a portion of the surface of the display element occupied by image elements can be adjusted. Without this reduction in occlusion, a distant turning arrow with a constant high intensity would become increasingly larger while approaching it, due to the augmented reality presentation, thus leading to a critical concealment. To avoid concealing driver-relevant information, the display elements can be reduced to contour lines. It has been shown in tests, however, that the visibility of these display elements, reduced to contour lines, cannot be ensured in bright ambient light. Furthermore, the size of the display elements can be limited, such that they can only grow to a certain size. This undermines the augmented reality effect, however. Using the solution described herein, the occlusion caused by the enlargement may be compensated for, by reducing the intensity. The salience of display elements is then reduced if the occlusion is critical or problematic. A sufficient salience in relation to the environment is necessary for the display to be discernable. This results in a compromise between discernibility and occlusion reduction.

In some examples, the at least one safety-relevant parameter may be configured using a distance from the vehicle to a target element or a time to a collision with the target element. A small object concealed by display elements, e.g., a child, can be considered as a particularly critical situation. Such a situation occurs most frequently in urban environments. The occlusion by display elements is most critical when they are at their largest, e.g., when the distance between the virtual display element and the ego-vehicle is minimal. To give the driver an opportunity to react to potentially concealed obstacles, the concealment should be reduced within a critical distance. The critical distance may depend on the speed of the ego-vehicle, where the time to a collision is often used as a safety indicator. In urban environments, values of 1.5 seconds for the time to a collision can be regarded as acceptable. In some situations, the time to a collision is not sufficient for this. In slow traffic situations, e.g., during rush hour, this could result in a very late reduction of the occlusion. It therefore makes sense to adjust the intensity on the basis of the distance in these cases.

In some examples, the size of the display element may be taken into account when adjusting the intensity. By way of example, the intensity adjustment can be limited to display elements of a minimum size, e.g., with respect to height, width or area. Display elements that are not occlusive may be disregarded in this manner. Furthermore, the size of the display element can be taken into account when determining the distance within which the intensity is to be adjusted.

In some examples, both the distance from the vehicle to a target element and the time to a collision therewith are determined, and a critical parameter may be selected for adjusting the intensity of the display element. The inclusion of the time parameter reliably reduces speed-dependent occlusion. This ensures that there is enough time to react and brake. By way of example, a relatively small display element at an ego-speed of 150 km/h can conceal a distant obstacle due to the contact-analog presentation, such that there is not enough time to react and brake if the solution is based only on the distance, or the size of the display element. The time-dependent solution, on the other hand, ensures that these obstacles are not concealed.

In some examples, the intensity can be adjusted between 100% and 0% of a nominal intensity, on the basis of the at least one safety-relevant parameter. Depending on the design of the display element, a display element can be composed of numerous parts that have different nominal intensities. By way of example, a virtual sign can be composed of three adjacent direction arrows with intensities of 100%, 70% and 50%. To simplify the adjustment of the intensities, it therefore makes sense to determine respective percentual adjustments of the nominal intensities.

In some examples, the intensity of the display element is only reduced on the basis of the at least one safety-relevant parameter, but not subsequently increased. In this manner, a fluctuation in intensity is prevented, e.g., when braking abruptly. If the intensity of the display element in a given situation is only affected by the time to a collision, this would result in a fluctuation in cases in which a driver is quickly approaching an intersection, and then decelerates, because the time to the collision then increases again. As a result, the intensity is only affected unidirectionally, e.g., decreased, at least by the time to the collision. If the time to the collision increases after the intensity has been decreased, the intensity remains at the previous level and first decreases again when the time to the collision falls below the previous lower value.

In some examples, the contour lines of the display element may remain visible. Because the contour lines of the display element are too thin to conceal objects in the environment, they can remain visible without causing problems. This also ensures that the information output by the display elements remains visible and comprehensible.

In some examples, functions for adjusting the intensity of the display element on the basis of the at least one safety-relevant parameter can be adjusted. The functions can be adjusted on the basis of the size of the display element, e.g., to determine the distance, below which an adjustment of the intensity should take place. These functions can also be adjusted by a vehicle user, who can adjust the presentation of the display elements to his personal preferences. The manufacturer of the vehicle or the augmented reality head-up display can also adjust the functions. They can react in this manner to amended guidelines or results of traffic research.

In some examples, the display element includes navigation instructions or a warning sign. Because these types of display element are used particularly frequently in contact-analog presentations, use of the solution according to the present disclosure is of particular relevance for these display elements.

In some examples, the target element may be an obstacle or an intersection. In the case of navigation instructions, the target element is normally an intersection, at which the navigation instruction is placed. Warning signs are usually used for obstacles, e.g., objects, other road users, or road damage.

display for a vehicle. At least one safety-relevant parameter is determined in a first step 10. The safety-relevant parameter can be, e.g., a distance from the vehicle to a target element, or a time to a collision with the target element. The target element can be an obstacle or an intersection, for example. If two or more safety-relevant parameters are determined 10, one of these parameters can optionally be selected 11 as a critical parameter. An intensity of a display element shown on the augmented reality head-up display, e.g., navigation directions or a warning signal, is subsequently adjusted 12 on the basis of the at least one safety-relevant parameter, in which the size of the display element can also be taken into account. By way of example, the opacity of the display element can be adjusted, or a portion of the display element populated with image elements can be adjusted. The functions for this can be adjusted, e.g., by a user or by a vehicle manufacturer. The intensity can advantageously be adjusted between 100% and 0% of a nominal intensity. Contour lines of the display element preferably remain visible. Advantageously, the intensity may only be reduced, and not subsequently increased in some examples. The display element is then output 13 for display on the augmented reality head-up display.

Figure 2:
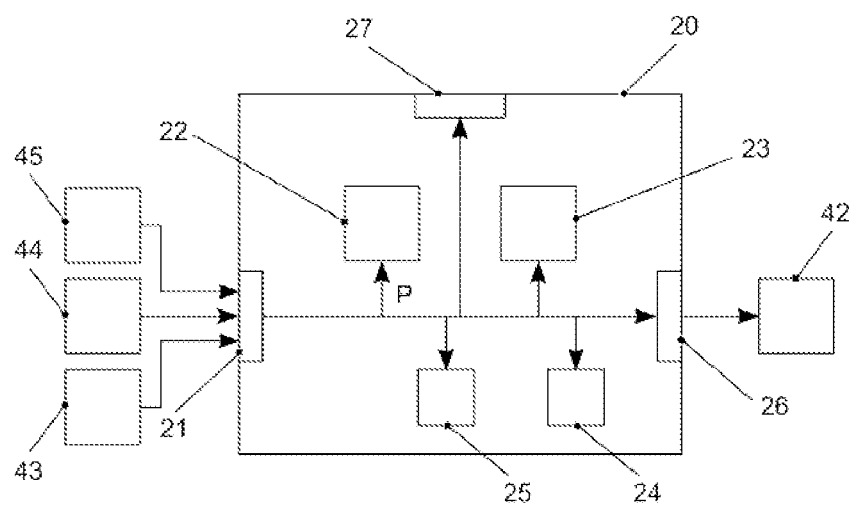
FIG. 2 shows a first embodiment of a device for controlling a display on an augmented reality head-up display for a vehicle according to some aspects of the present disclosure.

FIG. 2 shows a simplified schematic illustration of a first embodiment of a device 20 for controlling a display on an augmented reality head-up display for a vehicle. The device 20 has an input 21, via which information is received, from which an analysis module 22 determines at least one safety-relevant parameter P. By way of example, this information comprises image data from a camera 43, data from a sensor system 44, or data from a navigation system 45. The sensor system 44 may contain, for example, a laser scanner for a stereo camera for detecting objects in a vehicle's environment. A safety-relevant parameter can also be received indirectly via the input 21, which was previously determined by an external component. The safety-relevant parameter P can be, for example, a distance from the vehicle to a target element, or a time to a collision with the target element. The target element can be an obstacle or an intersection, for example.

If the analysis module 22 determines two or more safety-relevant parameters, one of these parameters can optionally be selected as the critical parameter by the analysis module 22. A control module 23 may be configured to adjust the intensity of a display element shown on the augmented reality head-up display, e.g., a navigation instruction or a warning sign, on the basis of the at least one safety-relevant parameter P, in which the size of the display element can also be taken into account. By way of example, the opacity of the display element can be adjusted, or a portion of the display element populated by image elements can be adjusted. The functions for this can be adjusted, e.g., by a user or the vehicle manufacturer. The intensity can advantageously be adjusted between 100% and 0% of a nominal intensity. Contour lines of the display element preferably remain visible. Advantageously, the intensity is only reduced, and not subsequently increased. The display element can then be output for display on the augmented reality head-up display, e.g., in the form of image data or control signals for a control unit 42 in the augmented reality head-up display, via an output 26 in the device 20.

The analysis module 22 and the control module 22 can be controlled by a control module 24. Settings of the analysis module 22, the control module 23, or the control module 24 can also be modified via a user interface 27. The data received by the device 20 can be stored, as needed, in a memory 25 in the device 20, e.g., for later analysis or use by the components in the device 20. The analysis module 22, control module 23, and the control module 24 can be dedicated hardware, e.g., in the form of integrated circuits. In this example, the device 20 may be configured as an independent component. It could also be integrated in the control unit 42 for the augmented reality head-up display.

Figure 3:
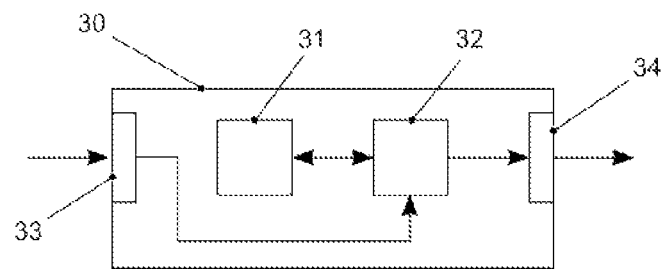
FIG. 3 shows a second embodiment of a device for controlling a display on an augmented reality head-up display for a vehicle according to some aspects of the present disclosure.

FIG. 3 shows a simplified schematic illustration of a second embodiment of a device 30 for controlling a display on an augmented reality head-up display for a vehicle. The device 30 may be configured with a processor 32 and a memory 31. By way of example, the device 30 is a computer or a control unit. Instructions are stored in the memory 31, with which the device executes the steps of the method described above when executed by the processor 32. The instructions stored in the memory 31 thus embody a program that can be executed by the processor 32, with which the method according to the present disclosure is implemented. The device 30 has an input 33 for receiving information, e.g., navigation data or data regarding the vehicle's environment. Data generated by the processor 32 are obtained at an output 34. They can also be stored in the memory 31. The input 33 and output 34 can be combined to form a bidirectional interface.

The processor 32 can include one or more processor units, such as microprocessors, digital signal processors, or combinations thereof.

The memories 25, 31 in these embodiments can contain both volatile and non-volatile memory areas, and different memory devices and mediums, such as hard disks, optical memories, or solid state memories.

Some embodiments of the present disclosure shall be described below in reference to FIGS. 4 to 11. The augmented reality head-up display is installed in a motor vehicle in this embodiment. As a matter of course, solutions according to the present disclosure are not limited to this application. The augmented reality head-up display can also be installed in other types of vehicles.

Figure 4:
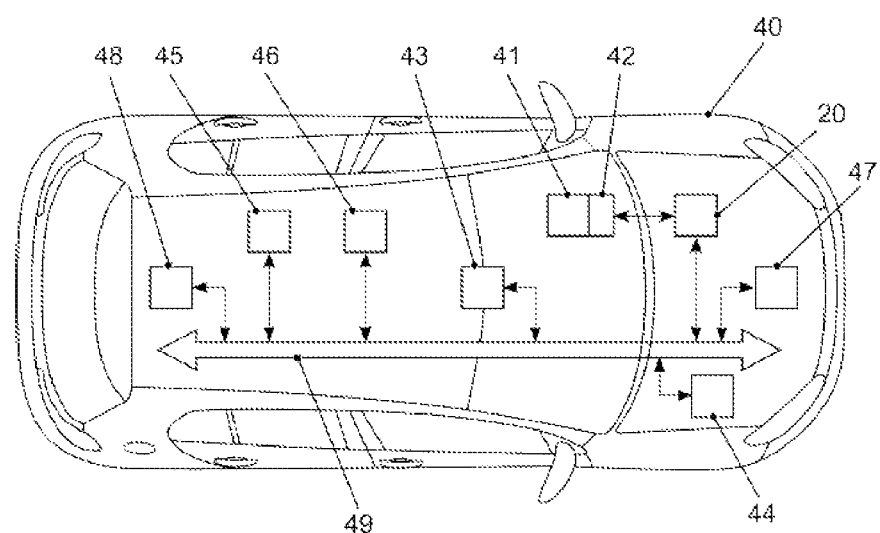
FIG. 4 shows a schematic illustration of a vehicle in which an exemplary solution according to the present disclosure is implemented.

FIG. 4 shows a schematic illustration of a vehicle 40 in which a solution according to the present disclosure is implemented. The vehicle 40 is a motor vehicle in this example. The motor vehicle includes an augmented reality head-up display 41 with a dedicated control unit 42. The motor vehicle also includes a device 20 for controlling a display on an augmented reality head-up display 41. The device 20 can also be integrated in the augmented reality head-up display 41 or in the control unit 42 in the augmented reality head-up display 41. Other components in the motor vehicle are a camera 43 and a sensor system 44 for detecting objects, a navigation system 45, a data transfer unit 46, and a series of assistance systems 47, one of which is shown by way of example. A connection to service providers can be obtained by means of the data transfer unit 46, e.g., for retrieving map data. There is a memory 48 for storing data. The data exchange between the various components in the motor vehicle may take place via a network 49.

Figure 5:
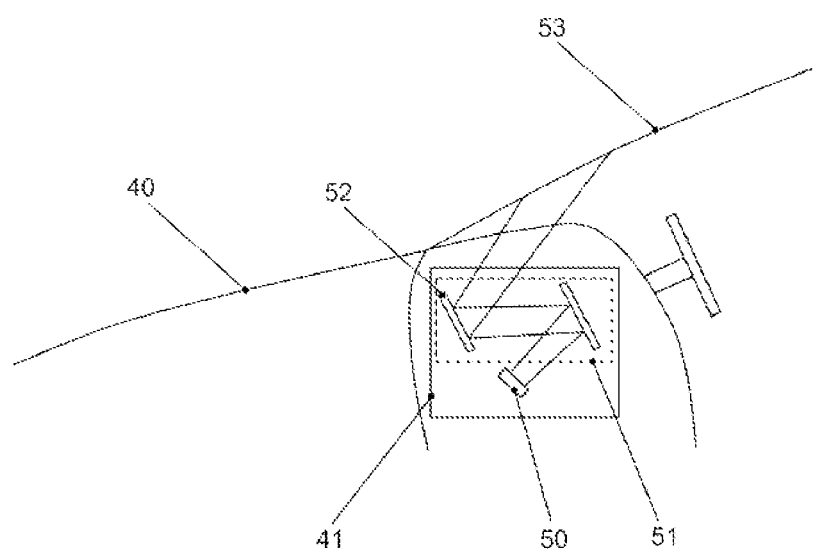
FIG. 5 shows a schematic illustration of a general construction of an augmented reality head-up display for a vehicle according to some aspects of the present disclosure.

FIG. 5 shows, schematically, an augmented reality head-up display 41 for a vehicle 40, a motor vehicle in this case, with which contents can be displayed on a projection surface 53 in the vehicle 40, e.g., on the windshield or an additional pane made of glass or plastic, located between the driver and the windshield on the dashboard. The contents that are displayed are generated by an imaging unit 50 and projected onto the projection surface 53 using an optical module 51. The projection in a motor vehicle may be configured to be in a region on the windshield above the steering wheel. The position of an eye box in the augmented reality head-up display can be adjusted by means of an optical component 52 in the optical module 51. The imaging unit 50 can be an LCD-TFT, for example. The augmented reality head-up display 41 may be configured to be installed in a dashboard in the motor vehicle.

Figure 6:
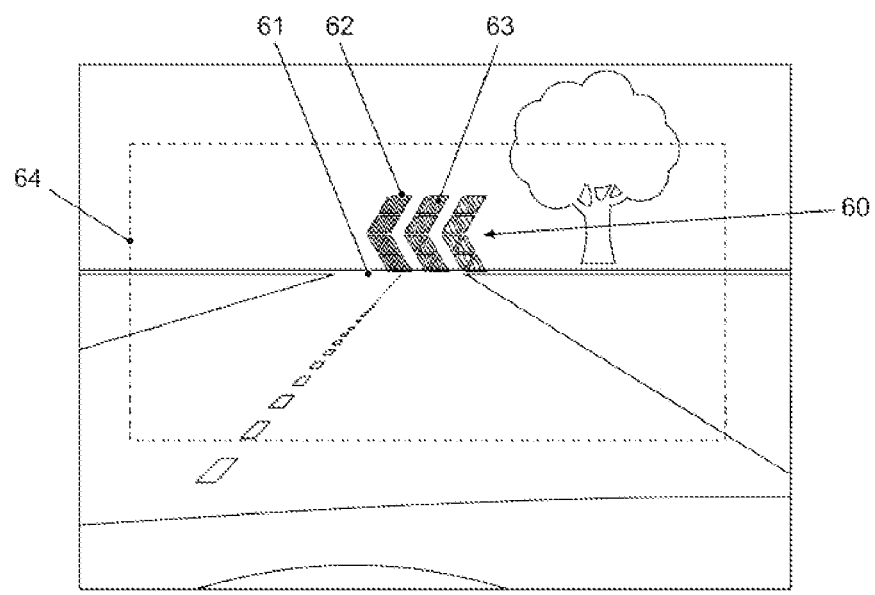
FIG. 6 shows a schematic illustration of a first exemplary embodiment of a display element at a greater distance to a vehicle according to some aspects of the present disclosure.

FIG. 6 shows, schematically, a first exemplary embodiment of a display element 60 at a greater distance to a vehicle. The display element 60 in this example may be configured as a sign placed in the environment, displayed in a field of vision 64 (FOV) of an augmented reality head-up display. This sign may be placed vertically to the road at the position of the target element 61, and is composed of three adjacent arrows, indicating the direction of the maneuver. The target element 61 is an intersection in this case, at which the maneuver is to take place. In this example, each arrow is composed of individual image elements 63, forming solid triangles here. The triangle forming the left-hand arrow has an intensity of 70%, and the right-hand arrow has an intensity of 50%. The individual triangles are each delimited by a contour line 62. The different intensities of the solid triangles are indicated by different cross-hatchings. The intensities in these embodiments are determined by the opacity of the filling.

Figure 7:
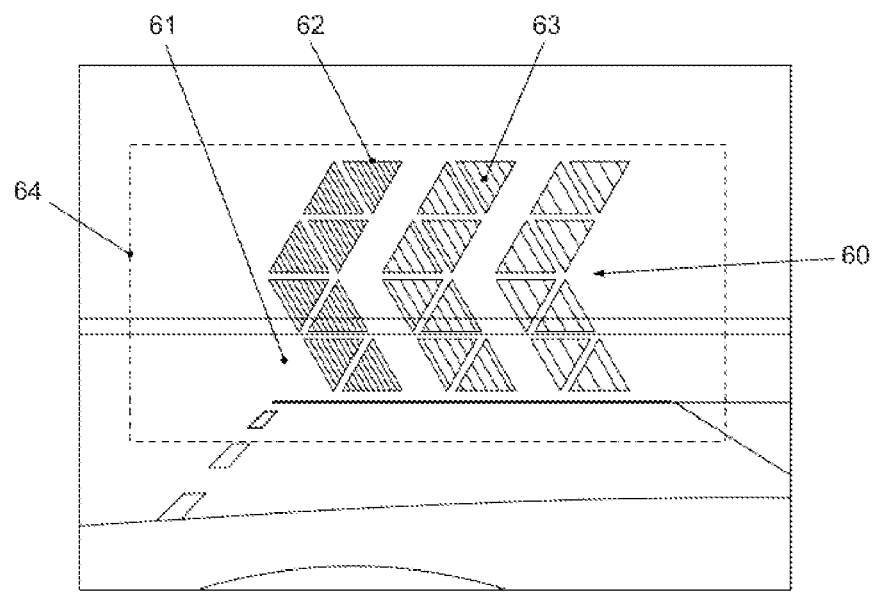
FIG. 7 shows a schematic illustration of the first exemplary embodiment of a display element at a shorter distance to a vehicle according to some aspects of the present disclosure.

FIG. 7 shows, schematically, the first exemplary embodiment of a display element 60 at a shorter distances to a vehicle. The display element 60 is the sign shown in FIG. 6 in this example. Analogously to real objects, the sign, or the arrows, become larger, as it is approached, resulting in the impression of an object placed in the environment. This can result in a substantial blocking of the driver's view, resulting in potential danger, in particular for pedestrians. There is also the possibility that the luminosity caused by the increasingly larger sign exceeds a threshold at a certain point, determined with regard to functional safety. This could result in a complete deactivation of the augmented reality head-up display. The intensity of the solid triangle is therefore adjusted on the basis of safety-relevant parameters, wherein the opacity may be reduced, as indicated by the cross-hatching. The contour lines 62 of the display element 60 remain visible in this example, because they are too thin to conceal objects in the environment, and they ensure a continuous visibility and clarity of the turning information. To prevent undesired side-effects, and improve the visibility and interpretability of the arrows, it makes sense to select a higher nominal intensity for the arrows, and a more acute angle than in prior applications that use these signs.

Figure 8:
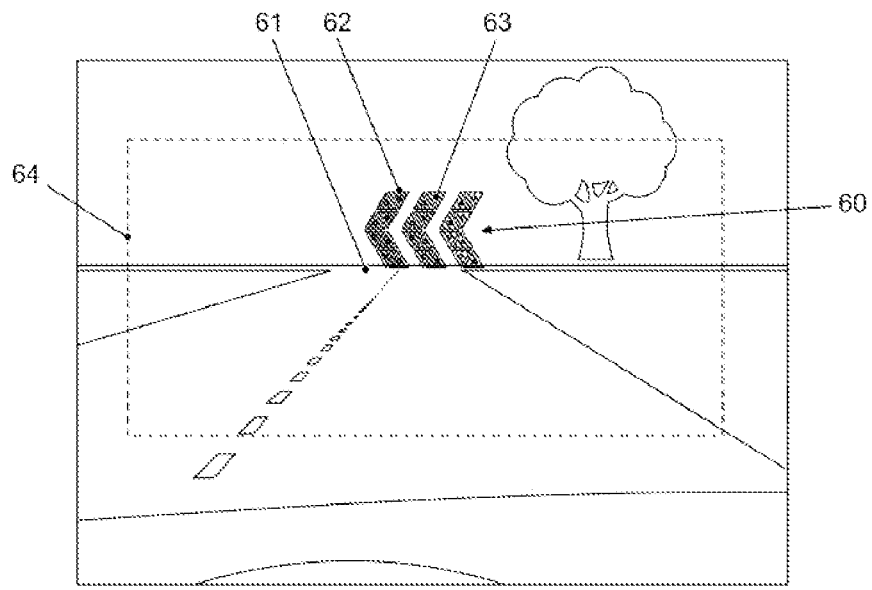
FIG. 8 shows a schematic illustration of a second exemplary embodiment of a display element at a greater distance to a vehicle according to some aspects of the present disclosure.

FIG. 8 shows, schematically, a second exemplary embodiment of a display element 60 at a greater distance to a vehicle. The display element 60 is again a sign displayed in the field of vision 64 of the augmented reality head-up display, composed of three adjacent arrows indicating the direction of the maneuver. In this example, each arrow is composed of individual image elements 63, partially solid triangles in this case. The triangle forming the left-hand arrow, which is closest to the target street, is configured with an intensity of 100%. The middle arrow is configured with an intensity of 70%, and the right-hand arrow is configured with an intensity of 50%. The individual triangles are each delimited by a contour line 62. The different intensities in this embodiment are determined by the portion of the display element 60 populated with image elements 63.

Figure 9:
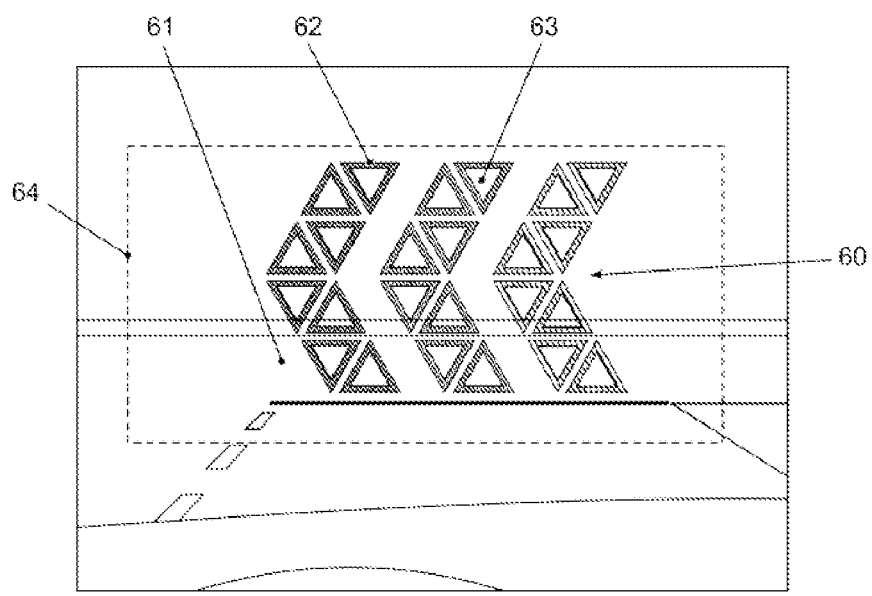
FIG. 9 shows a schematic illustration of the second exemplary embodiment of a display element at a shorter distance to a vehicle according to some aspects of the present disclosure.

FIG. 9 shows, schematically, the second exemplary embodiment of a display element 60 at a shorter distance to a vehicle. The display element 60 is again the sign shown in FIG. 8. To avoid dangerous situations that could result from the enlargement of the sign when it is approached, thus resulting in increased occlusion, the intensity of the triangles is also adjusted in this embodiment on the basis of safety-relevant parameters. In this case, however, the portion of the display element 60 populated by the image elements 63 is reduced. The opacity of the solid portions of the individual triangles remains unchanged. As a matter of course, it is also possible to combine both approaches, and also adjust the opacity.

The intensities of the individual triangles may be reduced as a function of both the distance from the ego-vehicle to the target element, such as the position of the virtual sign, as well as the time to a collision with the virtual sign. The adjustment of the intensities can take place, by way of example, according to the following logic:

If $(f_{intensity}(t) < f_{intensity}(d))$ {//the lower value is output
  target intensity=$f_{intensity}(t)$; } otherwise

{target intensity=$f_{intensity}(d)$;} if (target intensity<current intensity) {// it is ensured
  that the intensity decreases current
  intensity=target intensity;}

In this case, $f_{intensity}(t)$ describes the intensity as a function of the time to a collision with the target element, and $f_{intensity}(d)$ describes the intensity as a function of the distance from the ego-vehicle to the target element. The current intensity is the intensity currently used for presenting the individual triangles.

Figure 10:
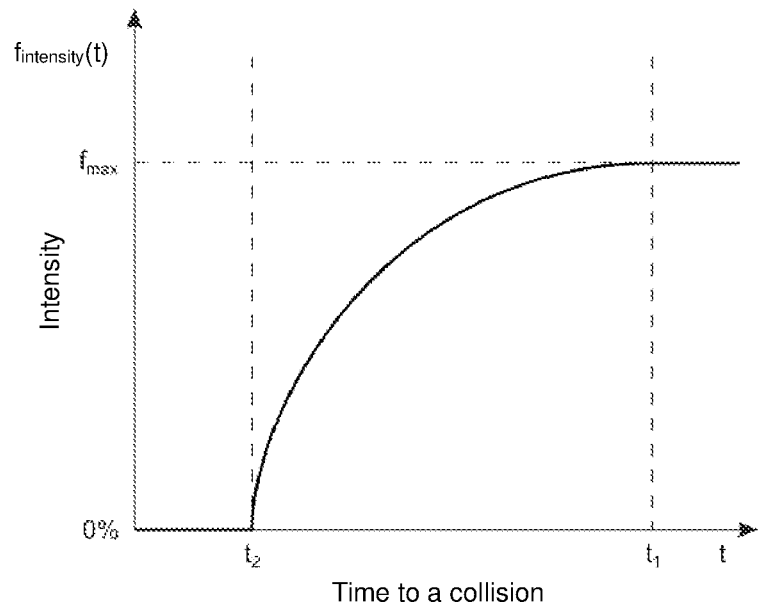
FIG. 10 shows a schematic illustration of a function graph illustrating the relationship of the intensity of a display element to a time to a collision with a target element according to some aspects of the present disclosure.

FIG. 10 shows, schematically, a function graph illustrating the relationship of the intensity of the display element as a function of time t to a collision with the target element. Values of 1.5 seconds for the time to the collision can be regarded as acceptable in urban environments. Accordingly, the intensity is successively reduced from a maximum value $f_{max}$ to a value of 0% between a first time $t_1$, e.g. $t_1=3.83$ seconds, and a second time $t_2$, e.g. $t_2=1.50$ seconds. If the display element is composed of numerous elements with different nominal intensities, as is the case with the three arrows in the sign described above, each element can have a different maximum value $f_{max}$. Alternatively, a single maximum value $f_{max}$ can be used. This can then be multiplied with a correction factor corresponding to the nominal intensity for each element. The function graph can preferably be adjusted, in particular with regard to the times $t_1$ and $t_2$. The curve between the two times may also be adjusted.

Figure 11:
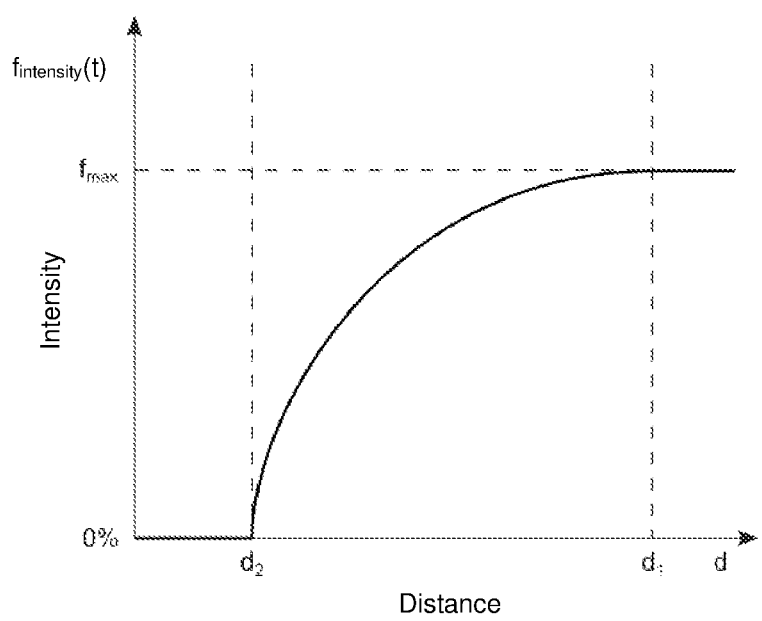
FIG. 11 shows a schematic illustration of a function graph illustrating the relationship of the intensity of a display element to a distance to a target element according to some aspects of the present disclosure.

FIG. 11 shows, schematically, a function graph illustrating the relationship of the intensity of a display element to a distance d to a target element. By way of example, the intensity can be successively reduced to 0% from a maximum value $f_{max}$ between a first distance $d_1$, e.g. $d_1=12.7$ meters, and a distance $d_2$, e.g. $d_2=5$ meters. The variable $d_2$ can be defined as that distance at which the display element reaches a height that is 65% of the height of the field of vision, at which the display element thus reaches a critical size with an occlusion characteristic. The distance $d_2$ in this case depends on the concrete design of the display element. The variable $d_1$ can be defined as a function of $d_2$ in the form $d_1=d_2+7.7$ meters, in one example. The function graph may be adjusted, in particular with regard to the distances $d_1$, $d_2$. Furthermore, the curve between the two times can also be adjusted.

With slow speeds, it may be the case that the time to the collision is greater than $t_1$, resulting in an intensity of $f_{max}$, while the distance is already shorter than $d_2$, resulting in an intensity of 0%. In these cases, the critical parameter must be selected, e.g., the distance in this case. The intensity may then be set to 0% accordingly.

The outlines or contour lines of the display elements or image elements from which the display element is composed, preferably remain at an opacity of 100% until the entire display element is faded out. By way of example, the entire display element can be faded out over the course of 500 ms, as soon as the display element has reached its maximum size. The height of the display element should not exceed the height of the field of vision. The borderlines surrounding the individual elements in the display elements, e.g., the three arrows in the sign described above, should not exceed the width of the field of vision. Both the distance, at which the maximum size is reached, and the length of the fade-out, can preferably be adjusted.

LIST OF REFERENCE SYMBOLS 10 determining safety-relevant parameters
11 selecting a parameter
12 adjusting an intensity of a display element
13 outputting the display element for display
20 device
21 input
22 analysis module
23 control module
24 control module
25 memory
26 output
27 user interface
30 device
31 memory
32 processor
33 input
34 output
40 vehicle
41 augmented reality head-up display
42 control unit for the augmented reality head-up display
43 camera
44 sensor system
45 navigation system
46 data transfer unit
47 assistance system
48 memory
49 network
50 imaging unit
51 optical module
52 optical components
53 projection surface
60 display element
62 contour lines
63 image element
64 field of vision
d distance
P parameter
t time

REFERENCES

[1] J. L. Gabbard et al.: "Behind the Glass: Driver Challenges and Opportunities for AR Automotive Applications," Proceedings of the IEEE, Vol. 102 (2014), pp. 124-136.

The invention claimed is:

1. A method for controlling visual indicia in a vehicle, comprising:
   operating a display in an augmented reality heads-up display for the vehicle, wherein the display comprises a display element having a plurality of individual image elements;
   determining at least one safety-relevant parameter from a sensor system relating to a target element of a vehicle driving environment, wherein the at least one safety-related parameter comprises a time-to-collision value;
   adjusting a size of the display element as a function of the time-to-collision value in the augmented reality heads-up display; and
   independently reducing intensities of the individual image elements of the display element based on a relative adjusted size of the display element within the display to maintain driver visibility of a forward driving environment during operating of the display.

2. The method of claim 1, wherein the at least one safety-relevant parameter further comprises
   a distance value representing a distance of the vehicle to the target element.

3. The method of claim 2, wherein the at least one safety-relevant parameter comprises a plurality of other parameters, and further comprising selecting one of the plurality of other parameters for adjusting the size and intensity of the display element within the display.

4. The method of claim 2, wherein the target element comprises an obstacle and/or an intersection.

5. The method of claim 1, wherein adjusting the intensity of the display element comprises one of:

adjusting the intensity between 100% and 0% of a nominal intensity on the basis of the relative adjusted size of the display element, and maintaining a reduced intensity of the display element.

6. The method of claim 1, wherein the display element comprises contour lines, and wherein adjusting the intensity of the display element comprises maintaining the visibility of the contour lines when the size and intensity of the display element is adjusted.

7. The method of claim 1, wherein the display element comprises a navigation instruction or a warning sign.

8. A device for controlling visual indicia in a vehicle, comprising:
- a sensor system for generating sensor data relating to a target element of a vehicle driving environment;
- an analysis module, operatively coupled to the sensor system, for determining at least one safety-relevant parameter from the sensor data relating to the target element, wherein the at least one safety-related parameter comprises a time-to-collision value;
- an augmented reality heads-up display for the vehicle, wherein the display comprises a display element having a plurality of individual image elements; and
- a control module for adjusting a size of the display element as a function of the time-to-collision value in the augmented reality heads-up display, and independently reducing intensities of the individual image elements of the display element based on a relative adjusted size of the display element within the display to maintain driver visibility of a forward driving environment during operating of the display.

9. The device of claim 8, wherein the at least one safety-relevant parameter further comprises
a distance value representing a distance of the vehicle to the target element.

10. The device of claim 9, wherein the at least one safety-relevant parameter comprises a plurality of other parameters, and further comprising selecting one of the plurality of other parameters for adjusting the size and intensity of the display element within the display.

11. The device of claim 9, wherein the target element comprises an obstacle and/or an intersection.

12. The device of claim 8, wherein adjusting the size and intensity of the display element comprises one of:
adjusting the intensity between 100% and 0% of a nominal intensity on the basis of the relative adjusted size of the display element, and maintaining a reduced intensity of the display element.

13. The device of claim 8, wherein the display element comprises contour lines, and wherein adjusting the intensity of the display element comprises maintaining the visibility of the contour lines when the size and intensity of the display element is adjusted.

14. The device of claim 8, wherein the display element comprises a navigation instruction or a warning sign.

15. A non-transitory computer-readable medium having stored therein instructions executable by one or more processors of a vehicle to:
- operate a display in an augmented reality heads-up display for the vehicle, wherein the display comprises a display element having a plurality of individual image elements;
- determine at least one safety-relevant parameter from a sensor system relating to a target element of a vehicle driving environment, wherein the at least one safety-relevant parameter comprises a time-to-collision value;
- adjust a size of the display element as a function of the time-to-collision value in the augmented reality heads-up display; and
- independently reduce intensities of the individual image elements of the display element based on a relative adjusted size of the display element within the display to maintain driver visibility of a forward driving environment during operating of the display.

16. The non-transitory computer-readable medium of claim 15, wherein the at least one safety-relevant parameter comprises a plurality of other parameters, and wherein the non-transitory computer-readable medium is further executable to select one of the plurality of parameters for adjusting the size and intensity of the display element within the display.

17. The non-transitory computer-readable medium of claim 15, wherein the display element comprises contour lines, and wherein adjusting the intensity of the display element comprises maintaining the visibility of the contour lines when the size and intensity of the display element is adjusted.

* * * * *